US012649648B2

(12) United States Patent
Hao et al.

(10) Patent No.: US 12,649,648 B2
(45) Date of Patent: Jun. 9, 2026

(54) WORK PLATFORM WITH PROTECTION AGAINST SUSTAINED INVOLUNTARY OPERATION

(71) Applicant: JLG Industries, Inc., McConnellsburg, PA (US)

(72) Inventors: Ji Hong Hao, Greencastle, PA (US); Ignacy Puszkiewicz, Hagerstown, MD (US); Jacob W. Snyder, Hastings, PA (US); Alan Gillman, Whitmore Lake, MI (US)

(73) Assignee: JLG Industries, Inc., McConnellsburg, PA (US)

(*) Notice: Subject to any disclaimer, the term of this patent is extended or adjusted under 35 U.S.C. 154(b) by 84 days.

(21) Appl. No.: 18/790,570

(22) Filed: Jul. 31, 2024

(65) Prior Publication Data

US 2024/0391746 A1 Nov. 28, 2024

Related U.S. Application Data

(63) Continuation of application No. 16/354,257, filed on Mar. 15, 2019, now Pat. No. 12,077,418, which is a continuation of application No. 14/950,845, filed on Nov. 24, 2015, now Pat. No. 10,358,331, which is a continuation-in-part of application No. 13/885,720, filed as application No. PCT/US2011/066122 on Dec. 20, 2011, now Pat. No. 9,586,799.

(60) Provisional application No. 61/435,558, filed on Jan. 24, 2011, provisional application No. 61/424,888, filed on Dec. 20, 2010.

(51) Int. Cl.
*B66F 17/00* (2006.01)
*B66F 11/04* (2006.01)

(52) U.S. Cl.
CPC .......... *B66F 17/006* (2013.01); *B66F 11/044* (2013.01)

(58) Field of Classification Search
CPC ......... B66F 11/00; B66F 11/04; B66F 11/044; B66F 17/00
See application file for complete search history.

(56) References Cited

U.S. PATENT DOCUMENTS 4,754,840 A 7/1988 MacDonald et al.
4,917,213 A 4/1990 Kessler et al.
4,942,529 A 7/1990 Avitan et al.
4,979,588 A 12/1990 Pike et al.
5,021,917 A 6/1991 Pike et al.
(Continued)

FOREIGN PATENT DOCUMENTS

CN 202030492 U 1/1900
CN 2934193 Y 8/2007
(Continued)

*Primary Examiner* — Charles J Han
(74) *Attorney, Agent, or Firm* — FOLEY & LARDNER LLP

(57) ABSTRACT

A platform assembly for a lift device includes a floor structure, a rail coupled to the floor structure and extending upward from the floor structure, a control panel coupled to the rail, a barrier having a first end coupled to the rail and a second end opposite the first end, and a sensor. The first end of the barrier is configured to detach from the rail in response to a trip force being applied to the barrier. The sensor is configured to provide a trip indication in response to the first end of the barrier being detached from the rail.

20 Claims, 8 Drawing Sheets

(56) References Cited

U.S. PATENT DOCUMENTS

| | | | |
|---|---|---|---|
| 5,740,887 | A | 4/1998 | Unger et al. |
| 5,992,562 | A | 11/1999 | Boeckman et al. |
| 5,992,572 | A | 11/1999 | Gilliland et al. |
| 6,065,565 | A | 5/2000 | Puszkiewicz et al. |
| 6,595,330 | B1 | 7/2003 | Henrickson et al. |
| 6,823,964 | B2 | 11/2004 | Goode |
| 6,842,684 | B1 | 1/2005 | Kade et al. |
| 6,880,187 | B1 | 4/2005 | Johnson |
| 7,194,358 | B2 | 3/2007 | Callaghan et al. |
| 7,397,351 | B1 | 7/2008 | Rubin et al. |
| 8,016,074 | B2 | 9/2011 | Black et al. |
| 8,490,746 | B2 | 7/2013 | Cummings |
| 8,813,910 | B2 | 8/2014 | Bowden |
| 9,022,160 | B2 | 5/2015 | Smith et al. |
| 9,243,412 | B1 | 1/2016 | Gallette et al. |
| 9,522,817 | B2 | 12/2016 | Castaneda et al. |
| 9,586,799 | B2 | 3/2017 | Hao et al. |
| 9,676,602 | B2 | 6/2017 | Cummings et al. |
| 9,776,847 | B2 | 10/2017 | Mondal et al. |
| 9,783,086 | B2 | 10/2017 | Parker et al. |
| 9,862,582 | B2 | 1/2018 | Cummings et al. |
| 10,029,899 | B2 | 7/2018 | Hao et al. |
| 10,618,786 | B2 | 4/2020 | Parot et al. |
| 10,926,986 | B2 | 2/2021 | Parot et al. |
| 2003/0172598 | A1 | 9/2003 | Greer |
| 2004/0045768 | A1* | 3/2004 | Puszkiewicz ......... B66F 17/006 182/69.5 |
| 2004/0173404 | A1 | 9/2004 | Kobel |
| 2005/0187712 | A1 | 8/2005 | Callaghan et al. |
| 2005/0224439 | A1 | 10/2005 | Bean et al. |
| 2007/0154063 | A1 | 7/2007 | Breed |
| 2008/0142713 | A1 | 6/2008 | Breed et al. |
| 2008/0144944 | A1 | 6/2008 | Breed |
| 2008/0262682 | A1 | 10/2008 | Bergsten |
| 2009/0260920 | A1 | 10/2009 | Cummings |
| 2010/0068018 | A1 | 3/2010 | Maguin |
| 2010/0114405 | A1 | 5/2010 | Elston et al. |
| 2010/0133043 | A1 | 6/2010 | Black et al. |
| 2010/0200332 | A1* | 8/2010 | Bowden ................ B66F 17/006 182/113 |
| 2010/0219018 | A1 | 9/2010 | Knaak |
| 2010/0289662 | A1 | 11/2010 | Shervey et al. |
| 2011/0046813 | A1 | 2/2011 | Castaneda et al. |
| 2011/0166721 | A1 | 7/2011 | Castaneda et al. |
| 2011/0286007 | A1 | 11/2011 | Pangrazio et al. |
| 2012/0078471 | A1 | 3/2012 | Siefring et al. |
| 2012/0152653 | A1 | 6/2012 | Bowden |
| 2012/0211301 | A1 | 8/2012 | Clark et al. |
| 2012/0318610 | A1 | 12/2012 | Cummings |
| 2013/0153333 | A1 | 6/2013 | Richards |
| 2013/0197760 | A1 | 8/2013 | Castaneda et al. |
| 2013/0233645 | A1 | 9/2013 | Hao et al. |
| 2013/0313040 | A1 | 11/2013 | Cummings et al. |
| 2014/0324310 | A1 | 10/2014 | Kobayashi et al. |
| 2014/0332314 | A1 | 11/2014 | Carrillo et al. |
| 2015/0008073 | A1 | 1/2015 | Cummings et al. |
| 2015/0027808 | A1 | 1/2015 | Baillargeon et al. |
| 2015/0144426 | A1 | 5/2015 | Hao et al. |
| 2015/0210115 | A1 | 7/2015 | David et al. |
| 2015/0217981 | A1 | 8/2015 | Baillargeon et al. |
| 2015/0368082 | A1 | 12/2015 | Davis et al. |
| 2016/0075543 | A1 | 3/2016 | Lombardo et al. |
| 2016/0221812 | A1 | 8/2016 | Puszkiewicz et al. |
| 2016/0264131 | A1 | 9/2016 | Chan et al. |
| 2016/0332856 | A1 | 11/2016 | Steedley |
| 2017/0008534 | A1 | 1/2017 | Nakatsuka et al. |
| 2017/0021764 | A1 | 1/2017 | Adams et al. |
| 2017/0107090 | A1 | 4/2017 | Mondal et al. |
| 2017/0233232 | A1 | 8/2017 | Davis et al. |
| 2017/0241155 | A1 | 8/2017 | Johnson |
| 2017/0255966 | A1 | 9/2017 | Khoury |
| 2017/0316696 | A1 | 11/2017 | Bartel |
| 2018/0022358 | A1 | 1/2018 | Fung et al. |
| 2018/0022405 | A1 | 1/2018 | Gecchelin et al. |
| 2018/0265336 | A1 | 9/2018 | Xu |
| 2019/0077646 | A1 | 3/2019 | Puszkiewicz et al. |

FOREIGN PATENT DOCUMENTS

| | | | |
|---|---|---|---|
| CN | 201665512 | U | 12/2010 |
| CN | 102259811 | | 11/2011 |
| CN | 102275850 | | 12/2011 |
| CN | 202379687 | U | 8/2012 |
| CN | 203877860 | U | 10/2014 |
| CN | 204281238 | U | 4/2015 |
| FR | 2836468 | A1 | 8/2003 |
| FR | 3000200 | A1 | 6/2014 |
| GB | 2 457 908 | A | 9/2009 |
| GB | 2 472 441 | A | 2/2011 |
| GB | 2 481 709 | | 1/2012 |
| GB | 2 495 158 | A | 4/2013 |
| JP | 62-153098 | A | 7/1987 |
| JP | S63-142400 | A | 9/1988 |
| JP | H01-118987 | | 5/1989 |
| JP | H01-285591 | | 11/1989 |
| JP | H04-116282 | | 4/1992 |
| JP | H04-065299 | U | 6/1992 |
| JP | H04-077600 | U | 7/1992 |
| JP | H05-124800 | | 5/1993 |
| JP | H07-049360 | B2 | 5/1995 |
| JP | H08-277099 | | 10/1996 |
| JP | H09-040381 | A | 2/1997 |
| JP | 2003-221195 | | 8/2003 |
| JP | 2005-289348 | | 10/2005 |
| JP | 2007-043383 | | 2/2007 |
| JP | 2011-063352 | A | 3/2011 |
| JP | 2013-010588 | A | 1/2013 |
| JP | 2013-010589 | A | 1/2013 |
| JP | 2013-052948 | | 3/2013 |
| JP | 2013-545693 | | 12/2013 |
| WO | WO-2009/037429 | A1 | 3/2009 |
| WO | WO-2011/015815 | | 2/2011 |
| WO | WO-2012/001353 | | 1/2012 |
| WO | WO-2012/088091 | | 6/2012 |
| WO | WO-2014/206982 | | 12/2014 |
| WO | WO-2016/123005 | A1 | 8/2016 |

* cited by examiner

WORK PLATFORM WITH PROTECTION AGAINST SUSTAINED INVOLUNTARY OPERATION

CROSS-REFERENCE TO RELATED PATENT APPLICATIONS

This application is a Continuation of U.S. application Ser. No. 16/354,257, filed on Mar. 15, 2019, which is a Continuation of U.S. application Ser. No. 14/950,845, filed on Nov. 24, 2015, now U.S. Pat. No. 10,358,331, which is a Continuation-In-Part of U.S. application Ser. No. 13/885,720, which is a National Stage filing of International Application No. PCT/US2011/066122, filed on Dec. 20, 2011, which claims the benefit of and priority to U.S. Provisional Application No. 61/424,888, filed on Dec. 20, 2010, and U.S. Provisional Application No. 61/435,558, filed on Jan. 24, 2011, all of which are incorporated herein by reference in their entireties.

STATEMENT REGARDING FEDERALLY SPONSORED RESEARCH OR DEVELOPMENT (NOT APPLICABLE)

BACKGROUND

The invention relates to work platforms and, more particularly, to a work platform including provisions to enhance protection for an operator from sustained involuntary operation resulting in an impact with an obstruction or structure.

Lift vehicles including aerial work platforms, telehandlers such as rough terrain fork trucks with work platform attachments, and truck mounted aerial lifts are known and typically include an extendible boom, which may be positioned at different angles relative to the ground, and a work platform at an end of the extendible boom. On or adjacent the platform, there is typically provided a control console including various control elements that may be manipulated by the operator to control such functions as boom angle, boom extension, rotation of the boom and/or platform on a vertical axis, and where the lift vehicle is of the self-propelled type, there are also provided engine, steering and braking controls.

A safety hazard can occur in a lift vehicle including a work platform when an operator is positioned between the platform and a structure that may be located overhead or behind the operator, among other places. The platform may be maneuvered into a position where the operator is crushed between that structure and the platform, resulting in serious injury or death.

BRIEF SUMMARY OF THE INVENTION

It would be desirable for a platform to incorporate protective structure to enhance protection of the operator from continued involuntary operation of the machine in proximity to an obstruction or structure. The protecting structure can also serve as a physical barrier to enhance protection for the operator and/or cooperate with the drive/boom functions control system to cease or reverse movement of the platform. If cooperable with the operating components of the machine, it is also desirable to prevent inadvertent tripping of the protective structure.

In an exemplary embodiment, a work platform for a personnel lift includes a floor structure, a safety rail coupled with the floor structure and defining a personnel work area, a control panel area including a control panel, and a barrier having at least one end that is detachably secured adjacent the control panel area. A switch is configured to provide a trip indication in response to detecting an application of a trip force to the barrier, where the trip indication modifies operation of the personnel lift. The at least one end of the barrier is configured to separate from adjacent the control panel area upon an application of a predetermined force to allow an operator to pass through a space previously occupied by the barrier.

The work platform may additionally include a controller configured to modify operation of the personal lift in response to receiving the trip indication from the switch. In some embodiments, the predetermined force may be greater than the trip force. The barrier and the switch may be positioned between the personnel work area and the safety rail. Relative to the floor structure, the barrier and the switch may be positioned above and in front of the control panel area.

In some embodiments, the barrier is a switch bar secured adjacent the control panel area. In this context, the switch may include a platform switch assembly attached to the switch bar.

The barrier may be positioned across the control panel area.

The work platform may be provided in combination with a personnel lift including a vehicle chassis and a lifting assembly secured to the vehicle chassis. The work platform is attached to the lifting assembly. A control panel disposed in the control panel area includes an operator input implement. Driving components are cooperable with the lifting assembly for lifting and lowering the work platform, and a controller communicates with the driving components, the control panel, and the switch. The controller is configured to control operation of the driving components based on signals from the operator input implement and the switch.

The controller may be programmed to shut down the driving components when the switch is tripped. The controller may be programmed to modify operating parameters of the driving components when the switch is tripped.

In another exemplary embodiment, a personnel lift includes a work platform including a floor structure, a safety rail coupled with the floor structure and defining a personnel work area, a control panel area, a barrier secured to the control panel area, and a switch cooperable with the barrier. The switch is configured to trip upon an application of a force to the barrier. At least one end of the barrier is detachable from the control panel area upon an application of a predetermined force such that the barrier at least partially separates from the work platform to allow an operator to pass through a space previously occupied by the barrier. The controller is configured to control operation of the driving components based on signals from the operator input implement and the switch, where the controller is programmed to initiate a reversal function and reverse a last operation when the switch is tripped.

In yet another exemplary embodiment, a work platform for a personnel lift includes a floor structure; a safety rail coupled with the floor structure and defining a personnel work area; a control panel area including a control panel; a barrier having at least one end that is detachably secured adjacent the control panel area; and a switch that is configured to provide a trip indication in response to detecting an application of a trip force to the barrier. The trip indication modifies operation of the personnel lift. The at least one end of the barrier is configured to separate from adjacent the control panel area upon an application of a predetermined force to allow an operator to pass through a space previously occupied by the barrier.

In still another exemplary embodiment, a personnel lift includes a work platform with a floor structure, a safety rail coupled with the floor structure and defining a personnel work area, a control panel area, a barrier associated with the control panel area, and a switch cooperable with the barrier that is configured to trip upon an application of a predetermined force to the barrier. The personnel lift includes a vehicle chassis and a lifting assembly secured to the vehicle chassis, where the work platform is attached to the lifting assembly. A control panel disposed in the control panel area includes an operator input implement and a go switch to enable operator input. Driving components are cooperable with the lifting assembly for lifting and lowering the work platform, and a controller communicating with the driving components, the control panel, and the switch controls operation of the driving components based on signals from the operator input implement and the switch. The controller may be programmed to initiate a reversal function and reverse a last operation when the switch is tripped, and the controller may be programmed to disable all functions after the reversal function is complete until functions are re-engaged with the go switch and the operator input implement when the switch is released.

BRIEF DESCRIPTION OF THE DRAWINGS

These and other aspects and advantages will be described in detail with reference to the accompanying drawings, in which.

DETAILED DESCRIPTION

Figure 1:
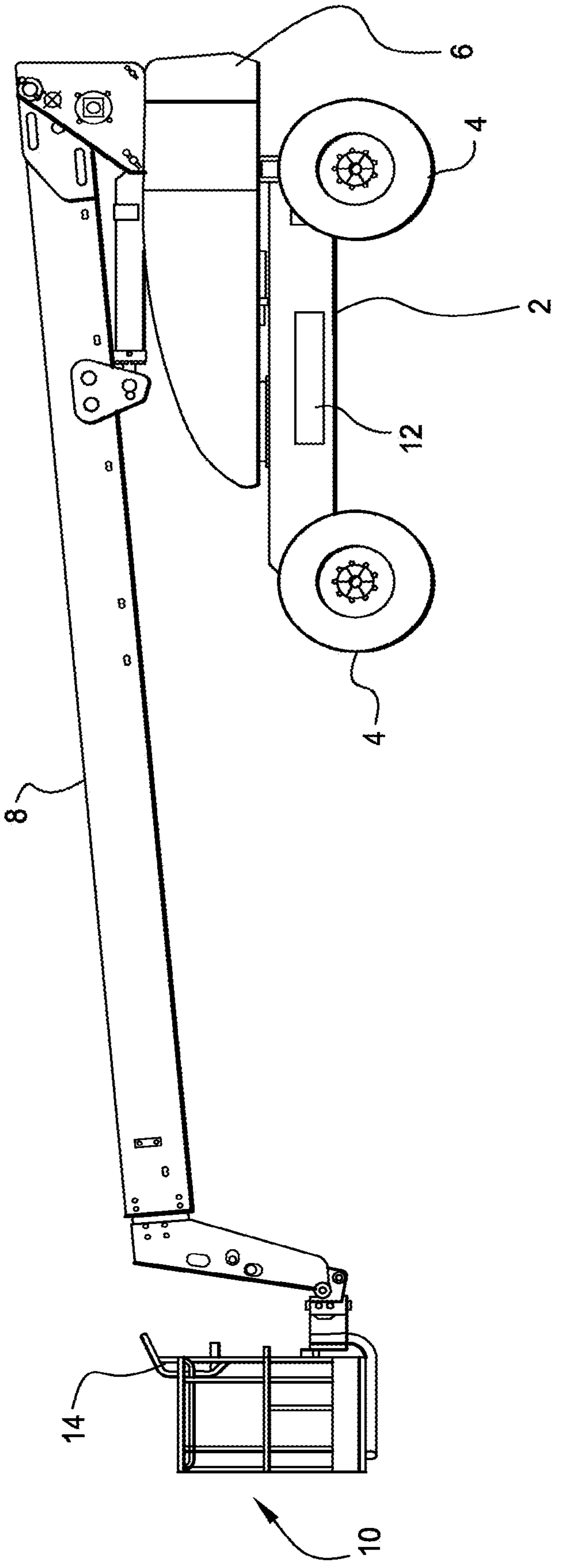
FIG. 1 illustrates an exemplary lift vehicle.

FIG. 1 illustrates an exemplary typical aerial lift vehicle including a vehicle chassis 2 supported on vehicle wheels 4. A turntable and counterweight 6 are secured for rotation on the chassis 2, and an extendible boom assembly is pivotably attached at one end to the turntable 6. An aerial work platform 10 is attached at an opposite end of the extendible boom 8. The illustrated lift vehicle is of the self-propelled type and thus also includes a driving/control system (illustrated schematically in FIG. 1 at 12) and a control console 14 on the platform 10 with various control elements that may be manipulated by the operator to control such functions as boom angle, boom extension, rotation of the boom and/or platform on a vertical axis, and engine, steering and braking controls, etc.

Figure 2:
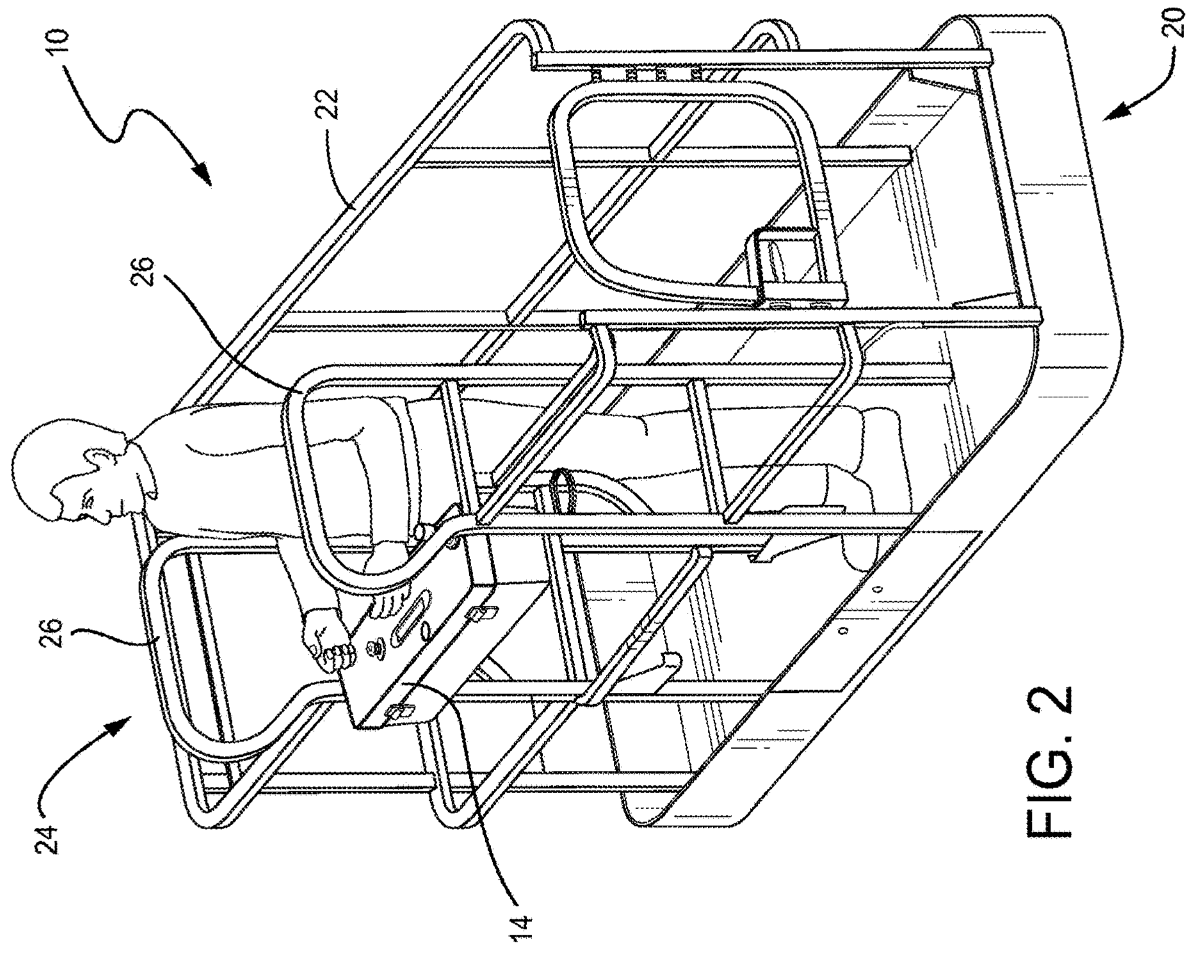
FIGS. 2-3 show a work platform including a protection envelope of a first embodiment.
Figure 3:
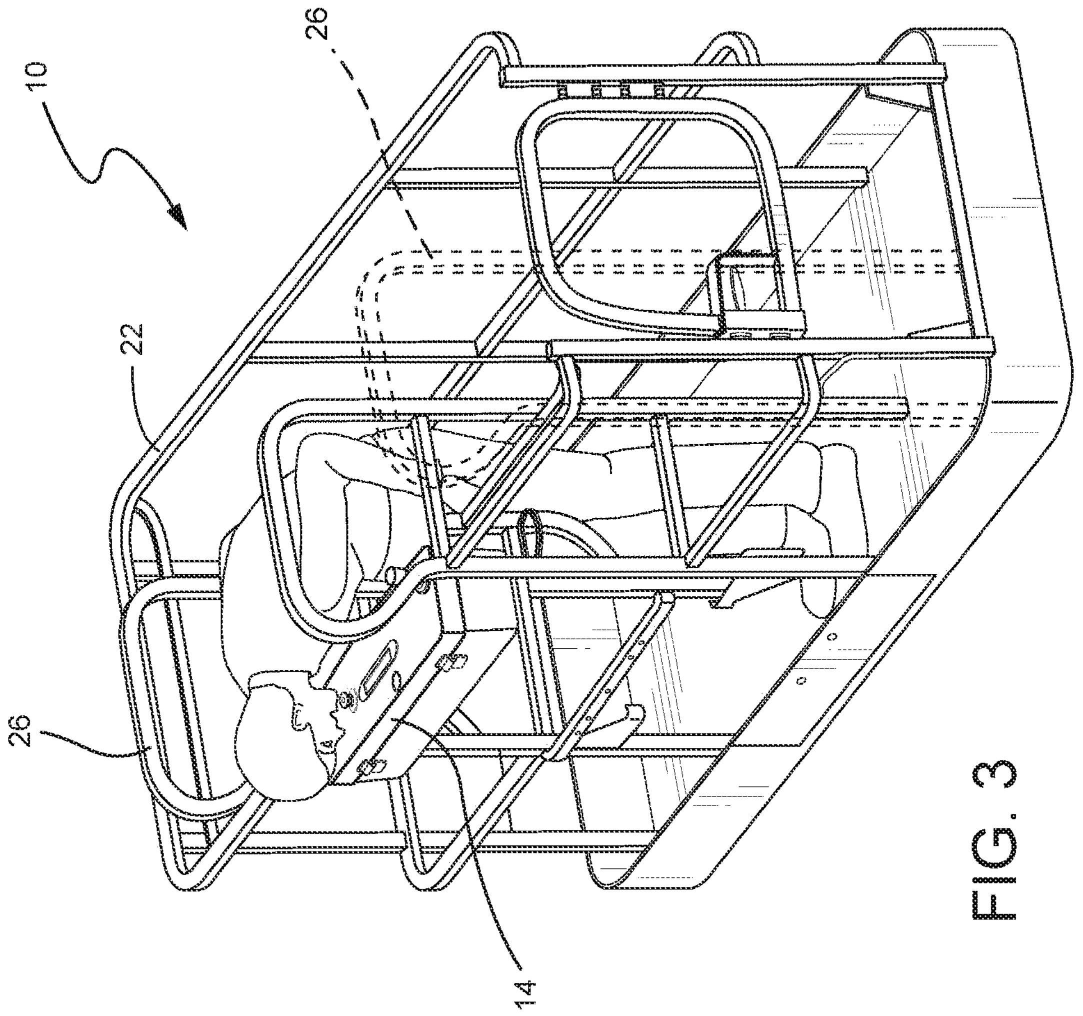

FIGS. 2 and 3 show an exemplary work platform 10 including a protection envelope according to a first embodiment of the invention. The platform 10 includes a floor structure 20, a safety rail 22 coupled with the floor structure 20 and defining a personnel work area, and a control panel area 24 in which the control panel 14 is mounted. The protection envelope surrounds the control panel area 24 and serves to enhance protection for the operator from an obstruction or structure that may constitute a crushing hazard.

As shown in FIGS. 2 and 3, the protection envelope may include protection bars 26 on either side of the control panel area 24 extending above the safety rail 22. The safety rail 22 includes side sections (the longer sections in FIGS. 2 and 3) and end sections (the shorter sections in FIGS. 2 and 3). The control panel area 24 may be positioned within one of the side sections. In one construction, the protection bars 26 are disposed intermediately within the one of the side sections adjacent the control panel area 24. In an alternative construction, the protection bars 26 may be disposed in alignment with the end sections of the safety rail 22 (as shown in dashed line in FIG. 3). Preferably, the protection bars 26 extend above the safety rail 22 by an amount sufficient to accommodate an anteroposterior diameter of an adult human (i.e., a distance between a person's front and back). In this manner, if an obstacle is encountered that could result in crushing the operator between the structure and the control panel 14, the operator will be protected from injury by the protection bars 26 with sufficient space between the control panel 14 and a top of the protection bars 26 to accommodate the operator's torso. FIG. 3 shows the user in a "safe" position where an encountered structure is prevented from crushing the operator by the protection bars 26.

Figure 4:
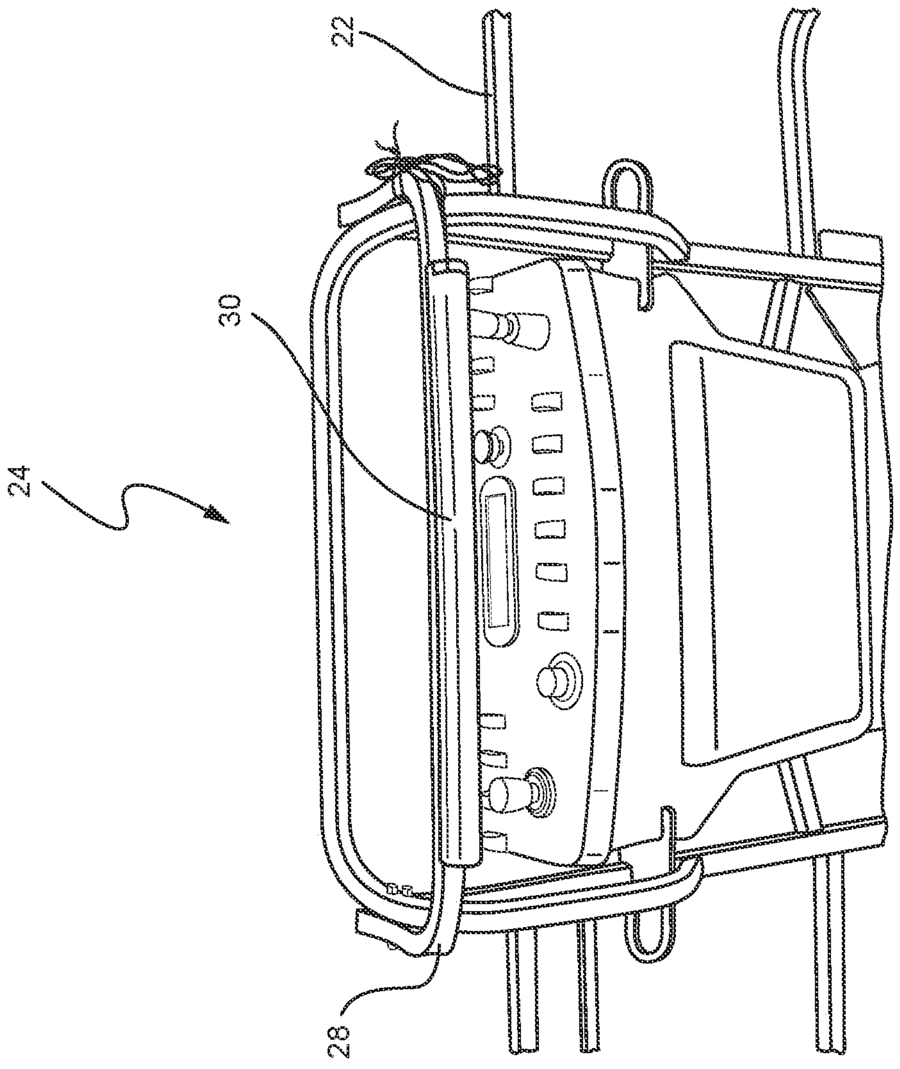
FIG. 4 shows a control panel area and a protective envelope including a platform switch.

An alternative protection envelope is shown in FIG. 4. In this embodiment, the protection envelope includes a switch bar 28 secured in the control panel area 24. A platform switch 30 is attached to the switch bar 28 and includes sensors for detecting the application of a force, such as by an operator being pressed into the platform switch by an obstruction or structure. The platform switch 30 is configured to trip upon an application of a predetermined force. It has been discovered that inadvertent tripping can be avoided if the predetermined force is about 40-50 lbs over a 6" sensor (i.e., about 6.5-8.5 lbs/in). As shown, the switch bar 28 and the platform switch 30 are positioned between the personnel work area and the safety rail 22. Relative to the floor structure, the switch bar 28 and the platform switch 30 are positioned above and in front of the control panel area 24. Based on an ergonomic study, it was discovered that the switch bar 28 and platform switch 30 should be positioned about 50" above the platform floor.

Figure 5:
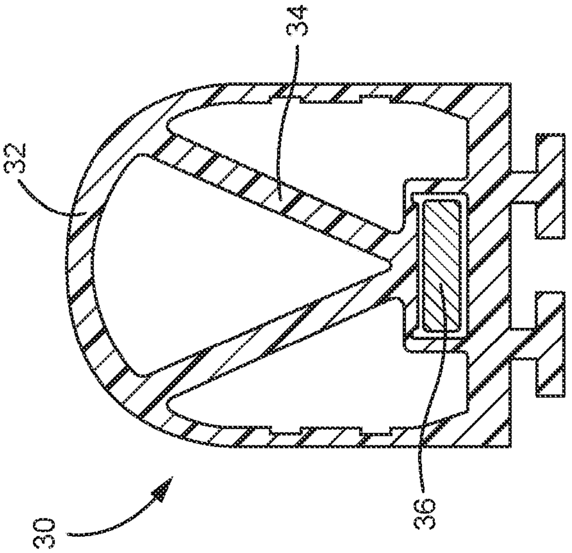
FIG. 5 is a cross-sectional view of the platform switch.

Although any suitable construction of the platform switch 30 could be used, a cross section of an exemplary switch 30 is shown in FIG. 5. The switch 30 includes a switch housing 32 with internal ribs 34 connected between the switch housing and a pressure switch 36. Sensitivity can be adjusted by selecting a different rating pressure switch 36 and/or by adjusting the number, shape and stiffness of the ribs 34. The switch bar 28 and platform switch 30 also serve as a handle bar that an operator can grab in an emergency.

Figure 6:
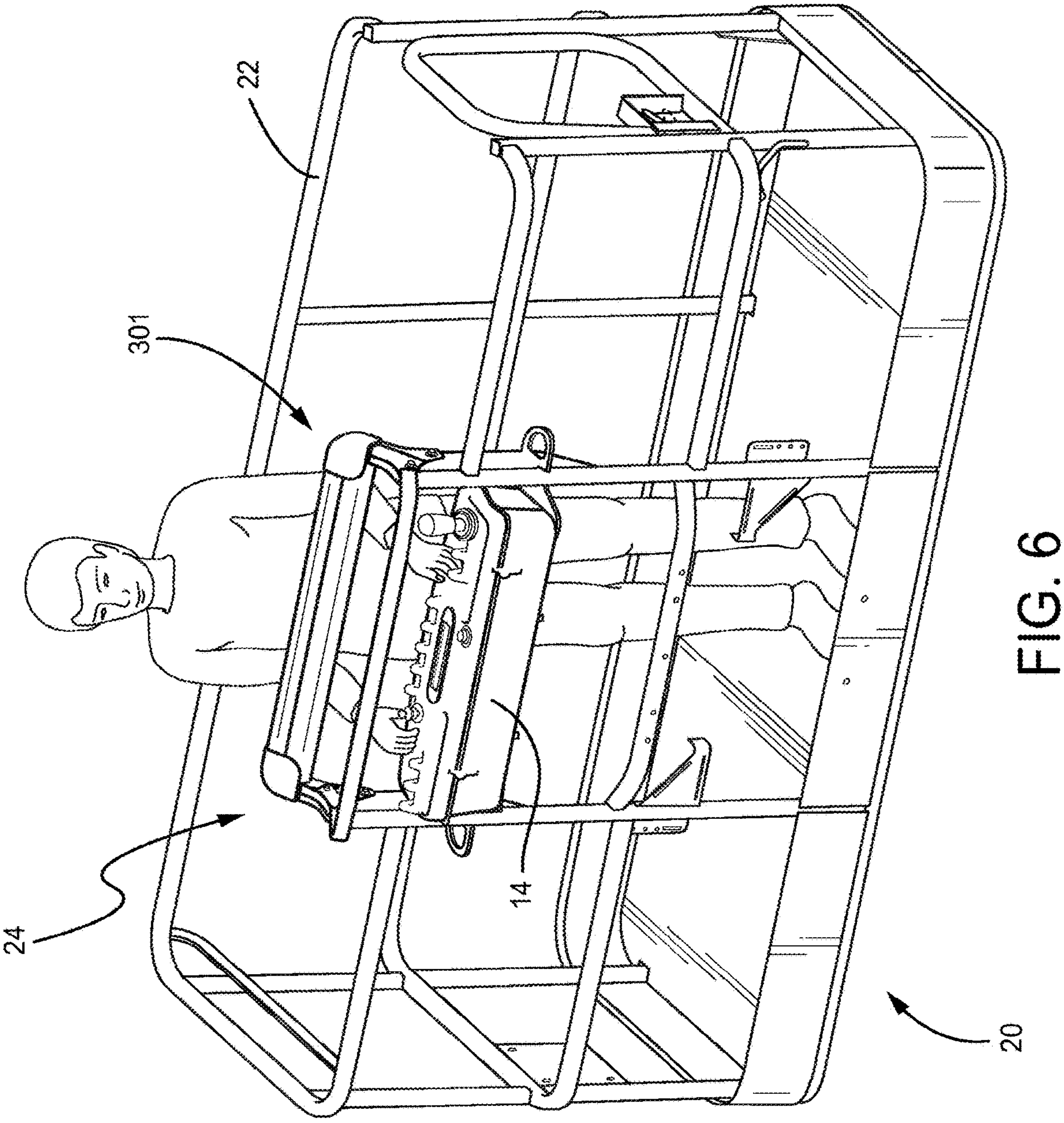
FIGS. 6-7 show an alternative design of the protection envelope including the platform switch.
Figure 7:
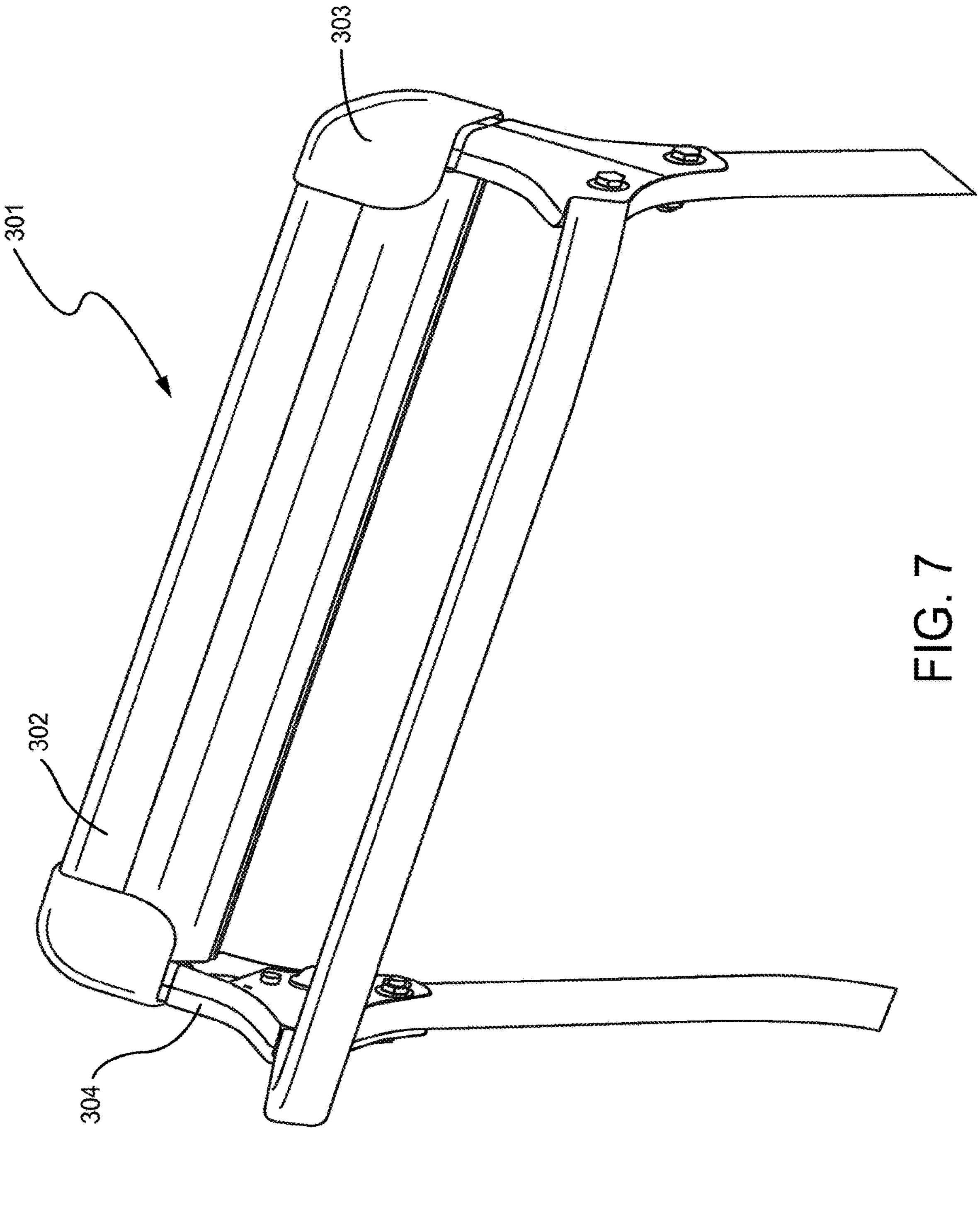

An alternative platform switch assembly 301 is shown in FIGS. 6 and 7. The switch assembly 301 includes a platform switch 302 with injection molded end caps 303 and die cast mounting brackets 304. The platform switch 302 operates in a similar manner to the switch 30 shown in FIGS. 4 and 5. An exemplary suitable switch for the platform switch is available from Tapeswitch Corporation of Farmingdale, NY.

Figure 8:
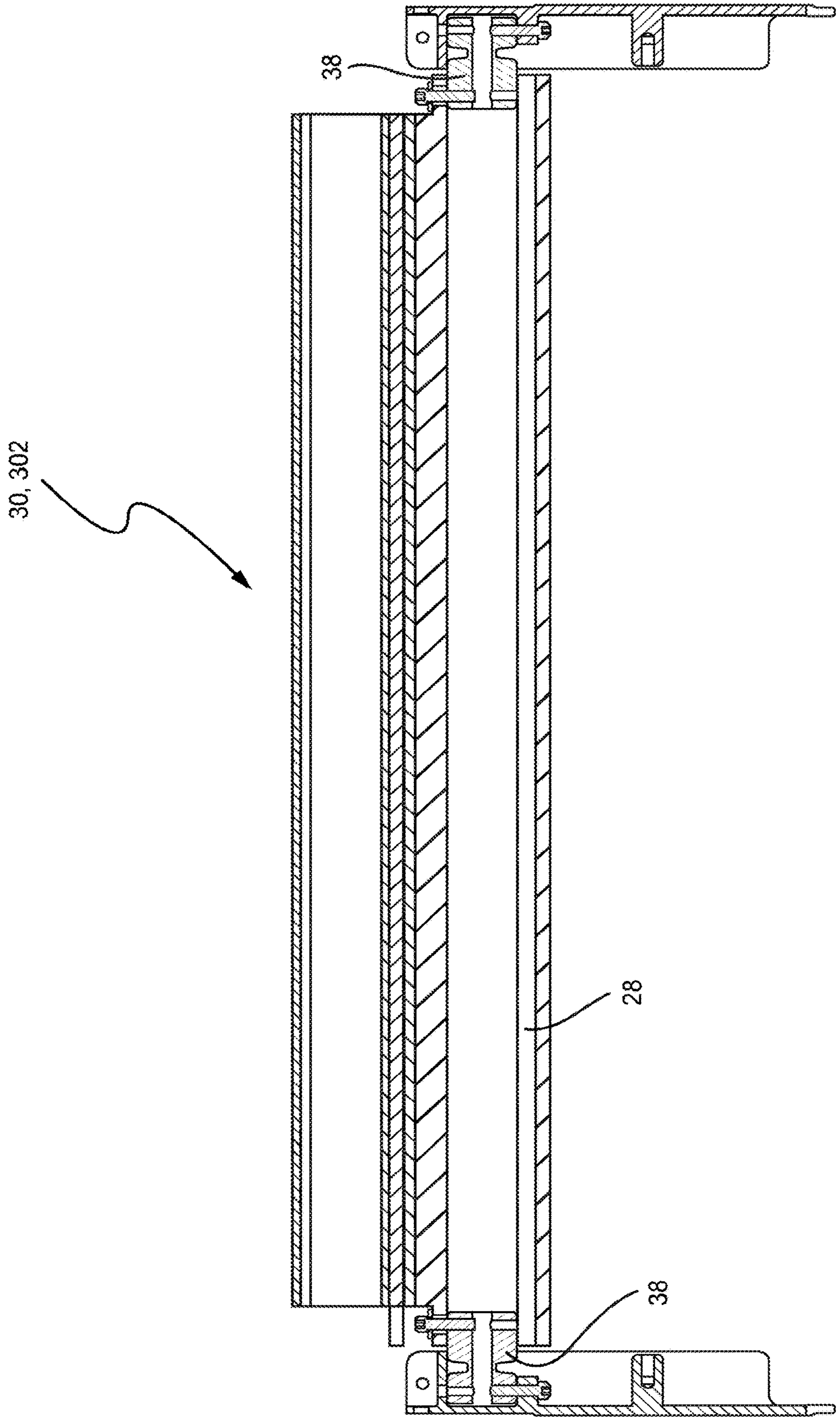
FIG. 8 shows the platform switch connected with shear elements.

With reference to FIG. 8, the platform switch 30, 302 and switch bar 28 may be secured to the control panel area 24 via a shear element 38. The shear element 38 includes a reduced diameter section as shown that is sized to fail upon an application of a predetermined force. With this construction, in the event that the machine momentum or the like carries the platform beyond a stop position after the platform switch is tripped, the shear elements 38 will fail/break to give the operator additional room to avoid entrapment. The predetermined force at which the shear element 38 would fail is higher than the force required to trip the platform switch 30, 301. In one construction, nylon may be used as the material for the shear element 38, since nylon has low relative elongation to plastic. Of course, other materials may be suitable.

In use, the driving components of the vehicle that are cooperable with the lifting assembly for lifting and lowering the work platform are controlled by an operator input implement on the control panel 14 and by the driving/control system 12 communicating with the driving components and the control panel 14. The control system 12 also receives a signal from the platform switch 30, 302 and controls operation of the driving components based on signals from the operator input implement and the platform switch 30, 302. At a minimum, the control system 12 is programmed to shut down driving components when the platform switch 30, 302 is tripped. Alternatively, the control system 12 may reverse the last operation when the platform switch 30, 302 is tripped.

If function cutout is selected, when the platform switch is tripped, the active function will be stopped immediately, and all non-active functions shall not be activated. If a reversal function is selected, when the platform sensor is tripped during operation, the operation required RPM target is maintained, and the active function only when the trip occurred is reversed until the reversal function is stopped. A ground horn and a platform horn can be activated when the reversal function is active. After the reversal function is completed, engine RPM is set to low, and all functions are disabled until the functions are re-engaged with the foot switch and operator controls. The system may include a platform switch override button that is used to override the function cut out initiated by the platform switch. If the override button is pressed and held, it enables the hydraulic functions if the foot switch and controls are re-engaged sequentially. In this event, function speed is set in creep mode speed automatically. The controller is programmed to avoid the cut out feature being disabled before the platform switch is tripped regardless of whether the override button is pressed or released. This assures that the cut out feature will still be available if the override button is stuck or manipulated into an always-closed position.

The reversal function is implemented for various operating parameters of the machine. For vehicle drive, if drive orientation shows that the boom is between the two rear wheels, reversal is allowed only when the drive backward is active and the platform switch is tripped. If a drive forward request is received when the platform switch is tripped, it is treated as a bump or obstacle in the road and will not trigger the reversal function. If the drive orientation shows that the boom is not in line with the rear wheels, then both drive forward and drive backward may trigger the reversal function. Additional operating parameters that are implemented with the reversal function include main lift, tower lift, main telescope (e.g., telescope out only), and swing.

Reversal function terminates based on the platform switch signal, footswitch signal and time parameters that are set for different functions, respectively. If the platform switch changes from trip status to non-trip status before the maximum reversal time is elapsed, then the reversal function will be stopped; otherwise, the reversal function is active until the maximum reversal time is elapsed.

Disengaging the footswitch also terminates the reversal function at any time.

If an operator is trapped on the platform, ground control can be accessed from the ground via a switch. In the ground control mode, if the platform switch is engaged, boom operation is allowed to operate in creep speed. If the platform switch changes status from engaged to disengaged, then operation is maintained in creep speed unless the ground enable and function control switch is re-engaged.

The protection envelope provided by the described embodiments serves to enhance protection for operators from an obstruction and continued involuntary operation. The protection envelope can include physical/structural protection in the form of protection bars or the like and/or a platform switch that is tripped upon the application of a predetermined force (such as by an operator being driven into the control panel by an obstruction or structure).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A platform assembly for a lift device, the platform assembly comprising:
- a floor structure;
- a rail coupled to the floor structure and extending upward from the floor structure;
- a control panel coupled to the rail;
- a barrier having a first end coupled to the rail and a second end opposite the first end, wherein the first end of the barrier is configured to detach from the rail in response to a trip force being applied to the barrier; and
- a sensor configured to provide a trip indication in response to the first end of the barrier being detached from the rail.

2. The platform assembly of claim 1, wherein the rail is a first rail, further comprising a second rail coupled to the floor structure and extending upward from the floor structure, wherein the control panel is positioned between the first rail and the second rail, and wherein the barrier extends from the first rail toward the second rail.

3. The platform assembly of claim 2, wherein the second end of the barrier is coupled to the second rail.

4. The platform assembly of claim 1, wherein the barrier is positioned above the control panel.

5. The platform assembly of claim 1, wherein the rail at least partially defines both (a) a personnel work area and (b) a control panel area containing the control panel, and wherein the barrier extends between the personnel work area and the control panel area.

6. The platform assembly of claim 1, wherein the sensor is a switch coupled to the rail.

7. The platform assembly of claim 1, further comprising a controller operatively coupled to the sensor and configured to control operation of the lift device based on the trip indication from the sensor.

8. The platform assembly of claim 7, wherein the controller is configured to initiate a reversal function and automatically reverse a last operation in response to receiving the trip indication.

9. The platform assembly of claim 7, wherein the controller is operatively coupled to the control panel and configured to control the operation of the lift device in response to the control panel receiving an input from an operator.

10. A platform assembly for a lift device, the platform assembly comprising:

a floor structure;

a rail coupled to the floor structure and extending upward from the floor structure;

a control panel coupled to the rail;

a barrier having a first end coupled to the rail and a second end opposite the first end, wherein the first end of the barrier is configured to detach from the rail in response to a predetermined trip force being applied to the barrier; and a sensor configured to provide a trip indication in response to the predetermined trip force being applied to the barrier.

11. The platform assembly of claim 10, wherein the rail is a first rail, further comprising a second rail coupled to the floor structure and extending upward from the floor structure, wherein the control panel is positioned between the first rail and the second rail, and wherein the second end of the barrier is coupled to the second rail.

12. The platform assembly of claim 10, wherein the barrier is positioned above the control panel.

13. The platform assembly of claim 10, wherein the rail at least partially defines both (a) a personnel work area and (b) a control panel area containing the control panel, and wherein the barrier extends between the personnel work area and the control panel area.

14. The platform assembly of claim 10, wherein the sensor is a switch coupled to the rail.

15. The platform assembly of claim 10, further comprising a controller operatively coupled to the sensor and configured to control operation of the lift device based on the trip indication from the sensor.

16. The platform assembly of claim 15, wherein the controller is configured to initiate a reversal function and automatically reverse a last operation in response to receiving the trip indication.

17. The platform assembly of claim 15, wherein the controller is operatively coupled to the control panel and configured to control the operation of the lift device in response to the control panel receiving an input from an operator.

18. A lift device comprising:

a chassis;

a platform assembly comprising:

a floor structure;

a rail coupled to the floor structure and extending upward from the floor structure;

a control panel coupled to the rail;

a barrier having a first end coupled to the rail and a second end opposite the first end, wherein the first end of the barrier is configured to detach from the rail in response to a predetermined trip force being applied to the barrier; and a sensor configured to provide a trip indication in response to the predetermined trip force being applied to the barrier;

a lift assembly coupling the platform assembly to the chassis;

a driving component operable to move the platform assembly; and a controller operatively coupled to the sensor and the driving component and configured to control operation of the driving component based on the trip indication.

19. The lift device of claim 18, wherein the controller is configured to initiate a reversal function and automatically reverse a last operation of the driving component in response to receiving the trip indication.

20. The lift device of claim 18, wherein the controller is configured to stop the operation of the driving component in response to receiving the trip indication.

* * * * *